Patented Dec. 9, 1930

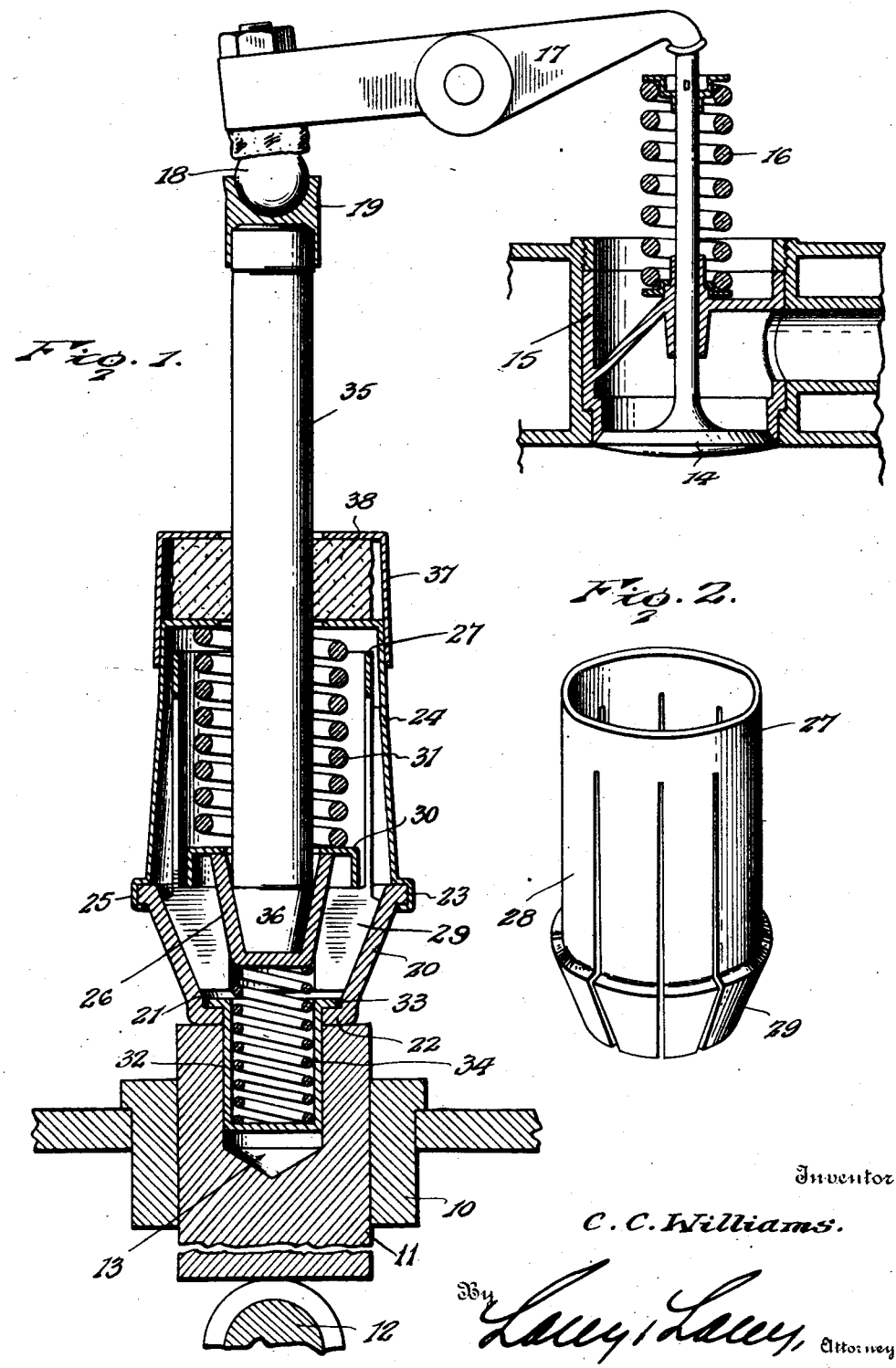

1,784,036

UNITED STATES PATENT OFFICE

CALVIN C. WILLIAMS, OF PHILADELPHIA, PENNSYLVANIA

VALVE-ACTUATING MECHANISM

Application filed September 6, 1928. Serial No. 304,369.

This invention relates to an improved valve actuating mechanism of the general character disclosed in my co-pending application for a similar invention filed October 26, 1927, Serial No. 228,893.

The invention seeks, among other objects, to provide a mechanism including a push rod incorporating a novel slip joint automatically operable to accommodate lengthening or shortening of the rod and wherein the floating clutch member of the slip joint will be so constructed as to prevent undue shortening of the rod by the opposing forces of the valve spring and tappet.

The invention seeks, as a further object, to provide a floating clutch member the clutch elements of which will offer a relatively large bearing area to the male and female clutch members of the slip joint so as to obviate premature wear of said elements as well as premature wear of said members.

And the invention seeks, as a still further object, to provide a floating clutch member wherein the clutch elements thereof will, as regards each other, always be at the same elevation between the male and female clutch members.

Other objects of the invention not specifically mentioned in the foregoing will appear during the course of the following description.

In the drawings,

Figure 1 is a vertical sectional view showing my improved mechanism in connection with a conventional overhead valve, and Figure 2 is a detail perspective view of the floating clutch member of the slip joint employed.

Referring now more particularly to the drawings, I have shown a fixed tappet guide at 10, and slidable through said guide is a tappet 11 operable by a cam shaft 12, the tappet being provided at its upper end with the customary axial recess 13. A conventional overhead valve of an internal combustion engine is indicated at 14, and slidably supporting the valve is a cage 15, the valve being normally held closed by a spring 16. Mounted to coact with the upper end of the valve stem is a rocker 17 carrying an adjustable ball 18, and formed to coact with said ball is a socket 19.

In carrying the invention into effect I employ a push rod in which is incorporated a novel slip joint. This slip joint includes a female clutch member in the form of a clutch cup 20, having a conical inner face 21 and provided with a flat bottom wall 22 which rests flat against the upper end of the tappet 11. Surrounding the upper end of the cup is an overhanging flange 23, and surrounding said flange is an upstanding frusto-conical cap or housing 24, provided at its lower end with a channel member 25 tightly embracing the flange 23 for rigidly connecting the cap to the cup. Extending into the clutch cap axially thereof is a hollow conical male clutch member 26 closed at its lower end by an end wall, and coacting with said members is a floating clutch member 27.

As shown in detail in Figure 2, the clutch member 27 is formed with a tubular body slotted longitudinally throughout the major portion of its length to provide a plurality of elongated spring tongues 28, and formed on said tongues at their lower ends are substantially wedge shaped clutch elements 29. The outer faces of these elements are inclined to seat flat against the conical inner faces 21 of the clutch cup 20, while the inner faces of said elements are inclined to seat flat against the conical outer face of the male clutch member 26, the outer inclined faces of the elements being longer than the inner faces. In the present instance, I have shown the clutch member slotted at eight equi-distant points but, of course, this detail may be varied as desired.

Overhanging the upper edge of the clutch member 26 is an annular follower 30 angle-shaped in cross section to rest at its lower edge against the upper end faces of the clutch elements 29 of the clutch member 27, and resting at its lower end against said follower is a spring 31, the upper end of which abuts the upper end wall of the cap 24. Extending snugly through the bottom wall 22 of the clutch cup 20 is a tubular axially disposed socket 32 which is removable received more or less freely within the recess 13 of the tappet 11. The socket is closed at its lower end, and formed on the upper end thereof is an annular flange 33 seating against the inner face of the bottom wall 22 of the clutch cup for limiting the socket against outward displacement. Resting at its lower end against the bottom wall of the socket and at its upper end against the lower end wall of the clutch member 26 is a spring 34. In this connection it should be observed that the spring 31 is of far less strength than the spring 16 of the valve, while the spring 34 is of far less strength than the spring 31.

Extending loosely through the top wall of the cap 24 of the female clutch member is a push rod element 35 which is provided at its lower end with a tapered terminal 36 snugly but removably fitting within the male clutch member 26, the male clutch member thus providing a socket for said element. At its upper end the element 35 is slightly enlarged to provide a head, and as will be observed, the socket 19 is shaped to snugly fit over said head. Freely surrounding the element 35 is a cap 37 frictionally fitting tightly over the upper end of the cap 24, and enclosed by the cap 37 is a felt or equivalent element 38 slidably receiving the push rod element therethrough. This felt is preferably saturated with oil which during the operation of the mechanism, will find its way into the slip joint for maintaining the parts lubricated.

As will be observed, the male clutch member 26 and associated parts are enclosed by the female clutch member 20 and cap 24 to provide a permanently assembled slip joint which is separate and distinct from the other parts of the mechanism. Accordingly, when installing the mechanism, the slip joint may be first connected with the tappet 11, when the push rod element 35 may be inserted at its lower end into the male clutch member 26 and the socket 19 disposed over the head of said element to coact with the ball 18. As will be perceived, the socket 32 will coact with the tappet 11 for maintaining the female clutch member in alinement with the tappet.

Assuming now that the tappet 11 is being raised, the upward thrust of the tappet will, as will be observed, be transmitted directly to the clutch elements 29 and, of course, at the instant such upward thrust is transmitted to said elements, the valve 14, spring 16, rocker 17 and push rod element 35 will be at rest. Accordingly, inertia of these parts will be sufficient to maintain the push rod element stationary momentarily and oppose the upward thrust of the tappet with sufficient force to cause upward endwise slipping of the clutch elements with a coincident upward movement of the clutch cup 20 independently of the clutch member 26. The follower 30 is therefore shifted upwardly by the clutch elements 29 to compress the spring 31 and due to the difference in the angularity of the clutch faces 21 of the cup and the clutch face of the member 26, the clutch elements 29 are, of course, independently shifted upwardly a distance greater than the independent movement of the clutch cup. The push rod is thus automatically contracted, but as the tappet continues in its upward movement and the inertia of the push rod element, rocker and valve, is overcome, the upward slipping of the clutch elements is arrested substantially at the instant the push rod element begins to yield to the upward movement of the tappet, when said clutch elements wedge between the clutch face 21 of the cup and the male clutch member 26 to provide a rigid connection between said cup and the push rod element so that the valve is opened.

Due to the automatic contraction of the push rod as the valve is opened, the opening travel imparted to the valve will be correspondingly shortened. Accordingly, upon the return of the tappet downwardly, the valve will seat before the tappet reaches the bottom of its throw so that the push rod element 35 will be relieved of the downward pressure otherwise exerted thereon by the valve spring 16. As a result the spring 31 will, as the tappet completes its downward movement, expand for again shifting the clutch elements 29 downwardly within the clutch cup 20 and thus wedge the clutch member 26 upwardly and lift the push rod element, so that the parts will be returned to their original positions, while all looseness between the parts will be automatically taken up. Rattling will thus be effectually prevented. The spring 34 is provided to accelerate the upward movement of the clutch member 26 incident to each cycle of the valve so that the parts will properly recover their normal positions at high engine speeds.

Attention is now directed to the fact that by employing a floating clutch member of the character described, the clutch elements 29 are so shaped as to provide large bearing areas to coact not only with the clutch cup 20 but also with the clutch member 26. Premature wear of all of these parts is thus obviated. Furthermore, as will be perceived, the clutch elements 29 will always be supported as with respect to each other, at the same elevation between the clutch members 20 and 26, and no one of said elements can slip downwardly to unduly wedge said members apart and impair the coaction of the remainder of said elements with said members. As previously intimated, the body of the floating clutch member 27 is formed of resilient material and the tongues 28 are of such length that, as the clutch elements move downwardly from the position shown in Figure 1, between the clutch members 20 and 26, said tongues will bow longitudinally so as to permit the inclined faces of said elements to always seat flat against the beveled faces of said members. A like functioning of the spring tongues will, of course, obtain as the clutch elements 29 are shifted upwardly so that the advantage of the full bearing area presented by the inclined spaces of said elements will, at all times, be realized.

Having thus described the invention, I claim:

1. An automatic take-up device including nested conical clutch members comprising rigid inner and outer members and a coacting intermediate member movable axially between the inner and outer members, the intermediate member including a plurality of clutch elements having flat contact with the inclined faces of the inner and outer members and shiftable for spacing said inner and outer members, yieldable means tending to axially shift said intermediate member in one direction, and yieldable means tending to axially shift the inner member in the opposite direction.

2. An automatic take-up device including nested conical clutch members comprising rigid inner and outer members and a coacting intermediate member movable axially between the inner and outer members, the intermediate member including a plurality of clutch elements having flat contact with the inclined faces of the inner and outer members and shiftable for spacing said inner and outer members, yieldable means tending to axially shift said intermediate member in one direction, yieldable means tending to axially shift the inner member in the opposite direction, and means enclosing the parts to provide a self-contained unit.

3. An automatic take-up device including nested conical clutch members comprising rigid inner and outer members and a coacting intermediate member movable axially between the inner and outer members, the intermediate member including a plurality of clutch elements having flat contact with the inclined faces of the inner and outer members and shiftable for spacing said inner and outer members, yieldable means tending to axially shift said intermediate member in one direction, a socket carried by the outer member, a spring in said socket and tending to axially shift the inner member in the opposite direction, and a cap carried by the outer member to enclose the parts and providing an abutment for said yieldable means.

In testimony whereof I affix my signature.

CALVIN C. WILLIAMS. [L. S.]